United States Patent [19]

Shindelaar

[11] 4,395,800
[45] Aug. 2, 1983

[54] HOSE RETAINER

[75] Inventor: Aloysius C. Shindelaar, Hudson, Iowa

[73] Assignee: Deere & Company, Moline, Ill.

[21] Appl. No.: 198,371

[22] Filed: Oct. 20, 1980

[51] Int. Cl.³ ............................................. A44B 17/00
[52] U.S. Cl. .................................. 24/217 W; 24/326; 138/89; 248/75
[58] Field of Search ...................... 248/75, 79, 89, 503, 248/74.7, 90, 51; 24/263 R, 255 SL, 217 W, 326; 138/89; 280/421; 137/355, 355.12, 355.16, 355.17

[56] References Cited

U.S. PATENT DOCUMENTS

| | | | |
|---|---|---|---|
| 458,188 | 8/1891 | Rasmussen | 24/263 R |
| 1,333,616 | 3/1920 | Hall et al. | 248/51 X |
| 2,683,468 | 7/1954 | Ikert | 248/51 X |
| 2,937,835 | 5/1960 | Csmereka | 248/74.7 |
| 3,650,545 | 3/1972 | Freed | 248/51 X |
| 3,757,031 | 9/1973 | Izraeli | 24/263 R |
| 3,760,811 | 9/1973 | Andrew | 24/263 R X |
| 4,311,992 | 1/1982 | DeChant | 24/255 SL X |
| 4,329,857 | 5/1982 | Kittle et al. | 138/89 X |

FOREIGN PATENT DOCUMENTS 2631464  5/1977  Fed. Rep. of Germany ... 24/217 W

Primary Examiner—William H. Schultz
Assistant Examiner—Ramon O. Ramirez

[57] ABSTRACT

A hose retainer is 20 disclosed for holding the end of a hydraulic hose, which has a breakaway coupler attached thereto, in a safe position when the hydraulic hose is not coupled to an adjoining piece of machinery. The hose retainer includes a first and a second body member each having a semicircular bore. The body members are joined together by attachment means so that the two semicircular bores form a circular bore having an exposed end opening. Located between the first and the second body members adjacent the circular bore is a retention means for retaining an insertable breakaway coupler within the circular bore thereby preventing contaminants from getting into the hydraulic hose.

9 Claims, 11 Drawing Figures

HOSE RETAINER

FIELD OF THE INVENTION

This invention relates to a hose retainer, for holding the free end of a hydraulic hose when the hose is not coupled to another piece of equipment.

BACKGROUND OF THE INVENTION

Present day agricultural and construction equipment utilize a number of hydraulic hoses which are attachable and detachable between a tractor vehicle and a trailing implement. Such hydraulic hoses normally contain a breakaway coupler at one or both ends. While in use, one end of the hydraulic hose is coupled to the tractor and the other end is coupled to the implement so as to form a closed hydraulic loop. When it is time to separate the implement from the tractor, the breakaway coupler at the implement end is disconnected and the implement is unhitched. After being disconnected, it is possible for the free end of the hydraulic hose to contact the ground and become dirty. Any dirt that adheres to the oily surface of the breakaway coupler can later enter the hydraulic line and cause failure of the equipment. In order to avoid such problems, people have designed hydraulic hose retainers to hold a hydraulic hose up and away from the ground. Many of these prior art hose retainers suffered from two deficiencies; first, they do not fully shelter the end of the breakaway coupler, and second, they normally require excessive force to insert the breakaway coupler into the hose retainer.

Now a hose retainer has been invented which will correct the above-mentioned deficiencies.

SUMMARY OF THE INVENTION

Briefly, this invention relates to a hose retainer for holding the free end of a hydraulic hose in a safe position. This hose retainer includes first and second body members, an attachment device for securing the two members together and a retention device positioned between the first and second body members, for retaining the free end of the hydraulic hose.

Both the first and the second body members contain a semicircular bore. The two semicircular bores combine to form a circular bore having an exposed end when the first and second body members are joined together. The retention device, which is positioned adjacent to the circular bore, is flexible so as to allow for the insertion and removal of the free end of the hydraulic hose or a breakaway coupler which is mounted on the end of a hydraulic hose.

The general object of this invention is to provide a hose retainer for retaining the end of a hydraulic hose in a safe position when it is not coupled to another piece of equipment. A more specific object of this invention is to provide a hose retainer for holding an end of a hydraulic hose in a clean environment when the hydraulic hose is not coupled to form a closed loop.

Another object of this invention is to provide a simplistic hose retainer for holding both a section of a hydraulic hose and an end of the hydraulic hose in a safe position.

Still another object of this invention is to provide an inexpensive and simple hose retainer which is capable of preventing contaminants from entering or contacting the end of a hydraulic hose or a breakaway coupler which is attached to the end of the hydraulic hose.

Still further, an object of this invention is to provide a hose retainer which can be easily mounted onto the frame of a vehicle or an implement.

Other objects and advantages of the present invention will become more apparent to those skilled in the art in view of the following description and the accompanying drawings.

DETAILED DESCRIPTION OF THE PREFERRED EMBODIMENT

Figure 5:
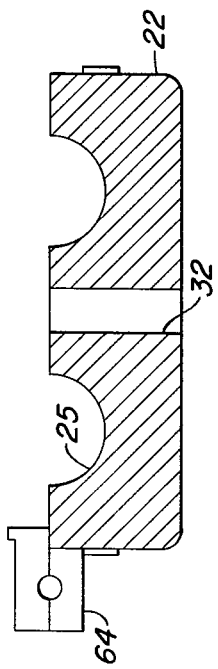
FIG. 5 is a cross sectional view of the lower half of FIG. 4.
Figure 1:
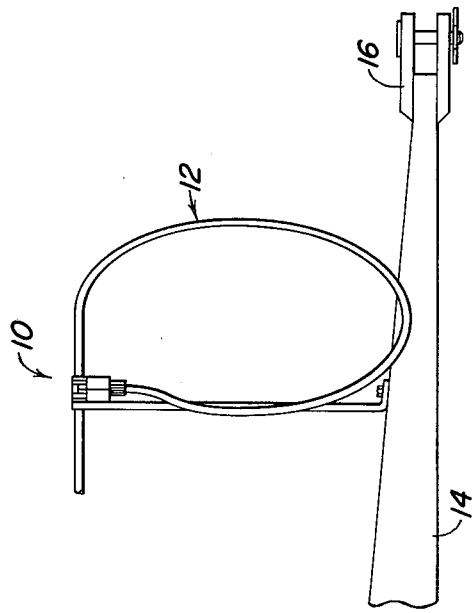
FIG. 1 is a view of a support member with an attached hose retainer.
Figure 3:
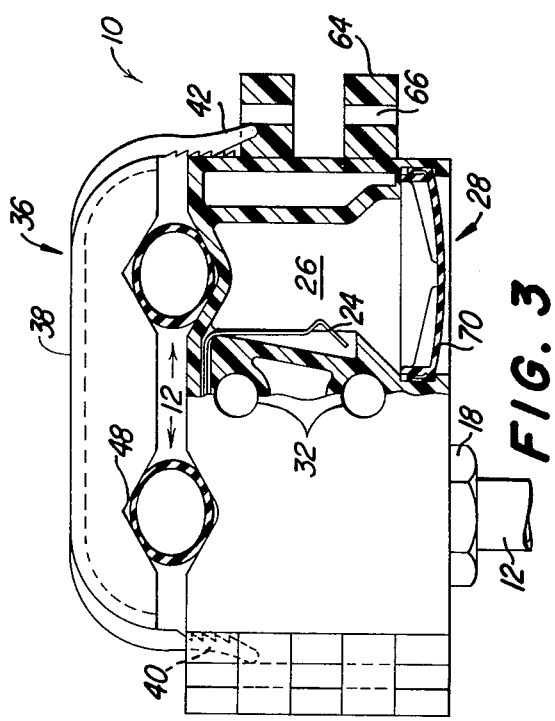
FIG. 3 is a plane view, partially in cross section, of the hose retainer.
Figure 4:
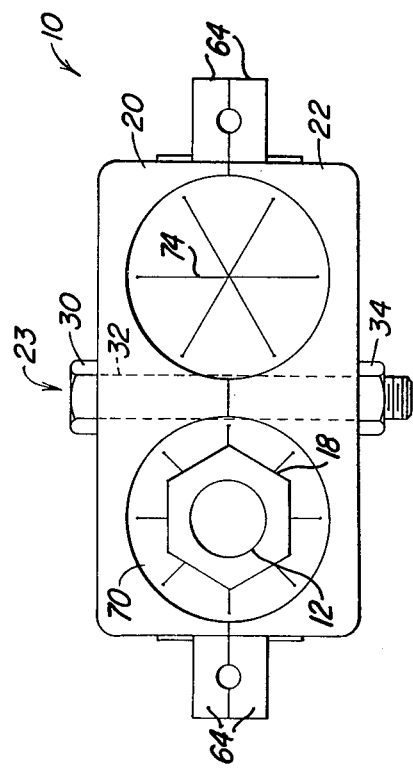
FIG. 4 is a front view of FIG. 3.
Figure 6:
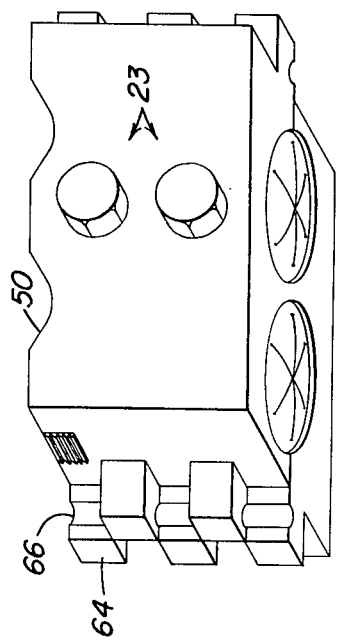
FIG. 6 is a perspective view of the hose retainer showing the outwardly projecting side tongues.

Referring now to the drawings, FIG. 1 shows a hose retainer 10 capable of holding a disconnected hydraulic hose 12 in a safe position. The hose retainer 10 can be mounted to a frame 14 of either a vehicle or an implement. As viewed in FIG. 1, the frame 14 is a connecting arm with an attached hitch 16, such as is common on an agricultural implement.

Figure 2:
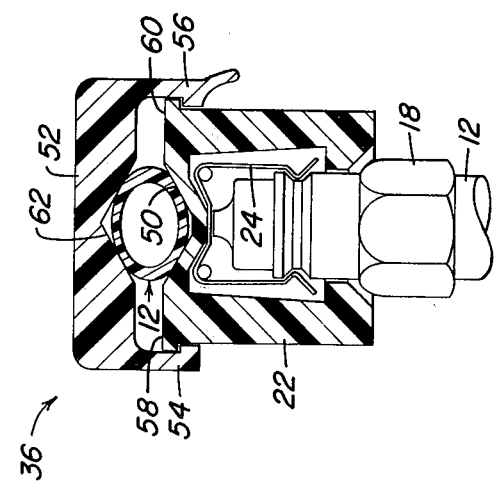
FIG. 2 is a cross-sectional view of the hose retainer with an attached breakaway coupler.

Turning now to FIG. 2, the hose retainer 10 is shown having a breakaway coupler 18, inserted into it. The coupler 18 is attached to an end of the hydraulic hose 12. The hose retainer 10 is also capable of holding a section of the hydraulic hose 12 which is distal from the breakaway coupler 18. The hose retainer 10 is formed of first and second body members 20 and 22 respectively, an attachment means 23 and a retention means 24 (FIGS. 2-6). The first and second body members 20 and 22 each contain at least one semicircular bore 25 (FIG. 5) which, when joined together by the attachment means 23, (FIG. 4), form a circular bore 26 having an exposed end 28. This exposed end 28 receives the breakaway coupler 18. The attachment means 23 is shown as a bolt 30 passing through a bore 32 and having a securing nut 34 affixed to its threaded end. Other common types of fasteners or interlocking devices, such as locking pins, aligning pins, screws and clips can also be used.

The retention means 24 (FIG. 3) of the hose retainer 10 is positioned between the first and second body members 20 and 22, respectively, and adjacent to the circular bore 26. The retention means 24 is positioned to securely contact the outer periphery of the breakaway coupler 18 in order to hold the breakaway coupler 18 snuggly within the circular bore 26. Preferably, the retention means 24 is positioned on the inner periphery of the circular bore 26. The retention means 24 can be a flexible expandable ring, a spring-loaded device, a spring, such as a garter spring, or other common type of engageable and disengageable device.

Figure 7:
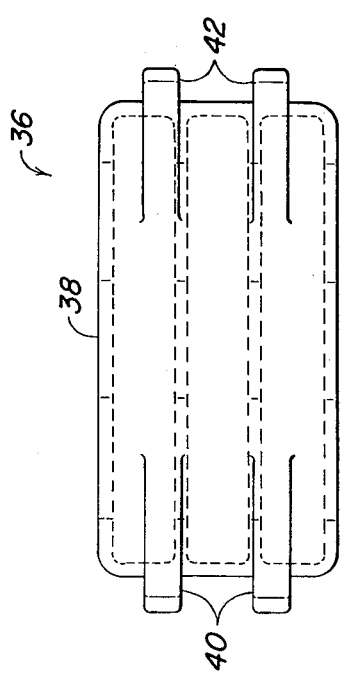
FIG. 7 is a plane view of an attachment member.
Figure 8:
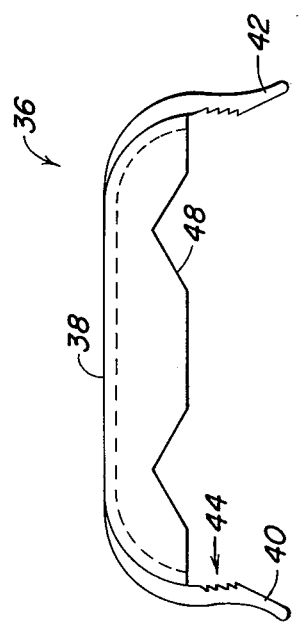
FIG. 8 is a front view of FIG. 7.

Referring to FIGS. 7 and 8, a clamping means 36 is shown attached to the first and second body members 20 and 22, respectively. The clamping means 36, holds a section of the hydraulic hose 12 against the first and second body members 20 and 22. The clamping means 36 is comprised of a single body member 38 with oppositely aligned flexible tabs or tongues 40 and 42. One or more tabs can be present on each side of the body member 38. Each tab 40 and 42 contains a plurality of teeth 44, preferably serrated teeth, having an apex pointed towards the body member 38. The teeth 44 mate with corresponding teeth 46, formed on the outer surface of both the first and second body members 20 and 22. The body member 38 also contains one or more recesses 48 formed perpendicular to the tabs 40 and 42.

These recesses 48 are designed to cooperate with similarly shaped recesses 50 located on the first and second body members 20 and 22, respectively. The recesses 48 and 50 combine to hold a section of the hydraulic hose 12 which is distal from the breakaway coupler 18. This clamping means 36 helps assure that a long section of a hydraulic hose will not become tangled and twisted.

Returning to FIG. 2, a second embodiment of the clamping means 36 is shown. In this embodiment, a body member 52 having oppositely aligned flexible fingers 54 and 56 attach onto shoulders 58 and 60 located on the first and second body members 20 and 22, respectively. In addition, a recess 62 is formed in the body member 52 between the fingers 54 and 56. The recess 62 cooperates with the recess 50 located in the first and second body members 20 and 22 as described above. Other types of clamping means 36 can also be utilized to accomplish the same function.

Referring again to FIGS. 5 and 6, each of the first and second body members 20 and 22 contain a plurality of staggerly arranged upper and lower projections or tongues 64 on one side thereof. When the first and second body members 20 and 22 are joined together, the projections 64 will appear on both sides of the hose retainer 10. Formed in each of the projections 64 is a semicircular bore 66 having an axis which passes completely through the staggerly arranged series of projections on a given side. The semicircular bores 66 enable a second identically designed hose retainer to be attached to the first hose retainer 10. In this case, the second hose retainer is secured by a pin 68 (not shown) which is inserted into the elongated hole formed when the semicircular bores 66 of each hose retainer are joined together.

Each of the hose retainers 10 can be constructed to hold two hydraulic hoses since most hydraulic devices are designed to utilize a pair of hoses. One hose is used to convey the fluid in one direction and the second hose is used to convey the fluid back in the opposite direction. Furthermore, on large agricultural tractors, four, six or even eight hydraulic hose connections will be present so that a sophisticated implement having diversified hydraulic functions can be attached to it. In this situation, several hose retainers 10 can be joined together to satisfy such an arrangement.

Figure 9:
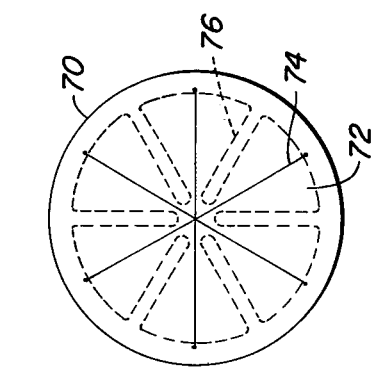
FIG. 9 is a view of a dust cover.
Figure 10:
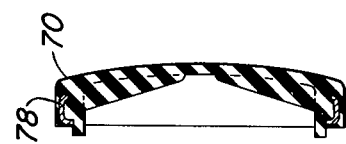
FIG. 10 is a side view of FIG. 9.

Turning now to FIGS. 9 and 10, the hose retainer 10 can be equipped with a flexible dust cover 70. This dust cover 70, which was the subject of an earlier U.S. Pat. No. 4,329,857, issued May 18, 1982 to Carl Kittle et al, and assigned to Deere & Company, contains a plurality of pie-shaped sections 72 divided by slits 74. The pie-shaped section 72 can contain a support rib 76 located on one surface so as to help retain its shape. The pie-shaped sections 72 are designed so as to allow the breakaway coupler 18 to pass therethrough whereby the pie-shaped sections 72 deform or are bent inward thereby forming a bond against the outer periphery of the breakaway coupler 18. The dust cover 70, preferably being constructed of a flexible rubber-like material, can contain a metal member 78. This metal member 78 will help retain the shape of the dust cover 70 as well as providing support for holding it within the circular bore 26 of the hose retainer 10.

Figure 11:
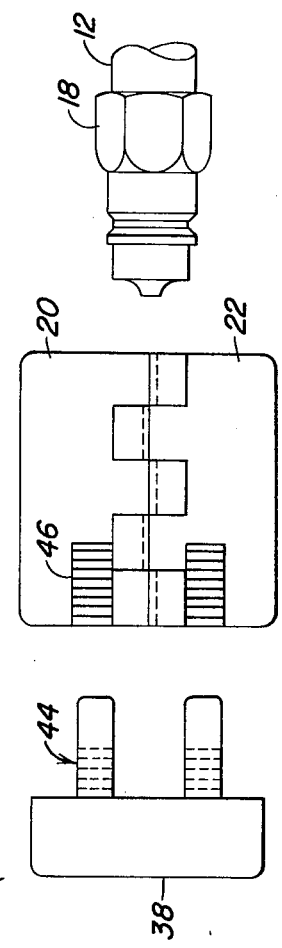
FIG. 11 is an exploded assembly view of the attachment member, the hose retainer and a breakaway coupler.

Lastly, FIG. 11 shows an exploded assembly of the breakaway coupler 18 engageable with the first and second body members 20 and 22. The clamping means 36 is attached onto the first and second body members 20 and 22 opposite the side which contains the exposed opening 28.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:
1. A hose retainer comprising:
 (a) a first body member containing a semicircular bore;
 (b) a second body member containing a semicircular bore;
 (c) attachment means for joining together said first and second body members to form a circular bore having an exposed end; and
 (d) spring means located between said first and second body members and adjacent to said circular bore for retaining an end of a hose.
2. A hydraulic hose retainer comprising:
 (a) a first body member containing a semicircular bore;
 (b) a second body member containing a semicircular bore;
 (c) attachment means for joining together said first and second body members to form a circular bore having an exposed end;
 (d) retention means located between said first and second body members and adjacent to said circular bore for retaining an end of a hydraulic hose; and
 (e) clamping means connected to said first and second body members for supporting a section of said hydraulic hose which is distant from said end of said hydraulic hose.
3. The hose retainer of claim 1 wherein said attachment means is an interlocking device.
4. A hydraulic hose retainer comprising:
 (a) a first body member containing a semicircular bore, one end of said semicircular bore being exposed to an outer surface of said first body member;
 (b) a second body member containing a semicircular bore, one end of said semicircular bore being exposed to an outer surface of said second body member;
 (c) attachment means for joining together said first and second body members to form a circular bore having an exposed end;
 (d) retention means located between said first and second body members and adjacent to said circular bore for retaining an end of a hydraulic hose; and

(e) clamping means connected to said first and second body members for supporting a section of said hydraulic hose distantly spaced from the end of said hydraulic hose, said clamping means comprising a body member having oppositely aligned flexible tabs, each tab having a plurality of serrated teeth.

5. The hydraulic hose retainer of claim 4 wherein a breakaway coupler is attached to the end of said hydraulic hose and is insertable into said circular bore.

6. A hose retainer for a hydraulic hose having a breakaway coupler mounted on one end thereof, said hose retainer comprising:
   (a) first and second symmetrical body members each containing at least one semicircular bore, one end of said semicircular bore being exposed to an outer surface of each of said first and second body members, a plurality of spaced apart projections extending outward from two oppositely aligned sides of each of said first and second body members, said projections having a semicircular bore extending therethrough, a plurality of teeth located on each side of said first and second body members, and at least one recess formed in each of said first and second body members aligned perpendicular to said semicircular bores;
   (b) attachment means for joining together said first and second body members to form at least one circular bore with an exposed end;
   (c) retention means located between said first and second body members and adjacent to said circular bore for retaining said breakaway coupler in said circular bore;
   (d) a dust cover closing the exposed end of said circular bore, said dust cover having a plurality of bendable pie-shaped sections which permit the through passage of said breakaway coupler; and
   (e) clamping means connected to said first and second body members for supporting a section of said hydraulic hose which is distant from said breakaway coupler, said clamping means comprising a body member having oppositely aligned flexible tabs, each tab containing a plurality of teeth designed to mesh with said teeth on said first and second body members; and at least one recess designed to cooperate with one of said corresponding recesses on said first and second body members.

7. The hose retainer of claim 6 wherein said teeth on said first and second body members have apexes slanted toward the exposed end of said circular bore.

8. A hose retainer for holding a breakaway coupler attached to an end of a hydraulic hose when said hydraulic hose is not fluidly connected in a closed loop, said hose retainer comprising:
   (a) first and second symmetrical body members each containing semicircular bores, one end of each of said semicircular bores being exposed, a plurality of spaced apart projections extending outward from two oppositely aligned sides of each of said first and second body members, said projections having a semicircular bore extending therethrough and aligned parallel to said semicircular bores, a plurality of serrated teeth located on the sides of said first and second body members which contain said projections, and recesses positioned in each of said first and second body members perpendicular to said semicircular bores;
   (b) a fastener joining together said first and second body members to form circular bores each having one exposed end;
   (c) retention means positioned between said first and second body members adjacent to each of said circular bores for retaining a breakaway coupler in each of said circular bores; and
   (d) a hose clamp attached to said first and second body members, said hose clamp comprising a body member having oppositely aligned flexible tabs, each of said tabs containing a plurality of serrated teeth designed to mesh with a set of said serrated teeth on said first and second body members; and parallely aligned recesses positioned on said body member, said recesses cooperating with said recesses on said first and second body members to hold a section of said hydraulic hoses therebetween, said section of hose being distant from said breakaway coupler.

9. The hose retainer of claim 8 wherein a dust cover encloses said exposed end of each of said circular bores.

* * * * *